(12) United States Patent
Olmsted et al.

(10) Patent No.: US 11,040,841 B2
(45) Date of Patent: Jun. 22, 2021

(54) BOLLARD WITH INTEGRATED CONTROL SYSTEM

(71) Applicant: The Chamberlain Group, Inc., Oak Brook, IL (US)

(72) Inventors: Robert John Olmsted, Wood Dale, IL (US); Casparus Cate, Chicago, IL (US); Randall Lee Planck, South Elgin, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 0 days.

(21) Appl. No.: 16/619,016

(22) PCT Filed: May 24, 2018

(86) PCT No.: PCT/US2018/034377
§ 371 (c)(1),
(2) Date: Dec. 3, 2019

(87) PCT Pub. No.: WO2018/226422
PCT Pub. Date: Dec. 13, 2018

(65) Prior Publication Data
US 2020/0102165 A1    Apr. 2, 2020

Related U.S. Application Data

(60) Provisional application No. 62/515,913, filed on Jun. 6, 2017.

(51) Int. Cl.
*B65G 69/00* (2006.01)
*B65G 69/28* (2006.01)

(52) U.S. Cl.
CPC ....... *B65G 69/2882* (2013.01); *B65G 69/003* (2013.01); *B65G 69/2888* (2013.01); *B65G 2814/0302* (2013.01)

(58) Field of Classification Search
CPC .............. B65G 69/003; B65G 69/2882; B65G 69/2888; B65G 2814/0302
(Continued)

(56) References Cited

U.S. PATENT DOCUMENTS 3,740,022 A * 6/1973 DiGiovanni ........ E04F 11/1812
256/24
4,692,755 A   9/1987 Hahn
(Continued)

OTHER PUBLICATIONS

BeLock Controller Plus—Restraint Must be Engaged Before Dock Door Can be Opened; Jamas Enterpies, LLC; http://www.jamasenterprises.con/BeLockController.html; May 2016; 2 pages.
(Continued)

*Primary Examiner* — Raymond W Addie
(74) *Attorney, Agent, or Firm* — Fitch, Even, Tabin & Flannery LLP

(57) ABSTRACT

A control panel is configured to operate one or more dock devices in a loading dock environment. The control panel can be supported at least in part by a bollard disposed in the loading dock environment. In one form, the bollard is configured to contain portions of the control panel and dock devices including sensors, lights, and the like. In one form, the control panel and one or more dock devices are mounted to a preexisting bollard to add functionality to the loading dock environment.

43 Claims, 10 Drawing Sheets

(58) Field of Classification Search
USPC .................................................. 14/69.5–72.5
See application file for complete search history.

(56) References Cited

U.S. PATENT DOCUMENTS

| | | | |
|---|---|---|---|
| 4,843,373 A | 6/1989 | Trickle | |
| 5,762,460 A * | 6/1998 | Rae ...................... | B65G 69/006 |
| | | | 14/69.5 |
| 6,781,516 B2 | 8/2004 | Reynard | |
| 6,812,849 B1 | 11/2004 | Ancel | |
| 6,832,870 B1 * | 12/2004 | Krivoy ................. | E01F 15/006 |
| | | | 404/6 |
| 6,975,226 B2 | 12/2005 | Reynard | |
| 7,018,129 B1 * | 3/2006 | Smith .................... | G09F 19/22 |
| | | | 256/1 |
| 7,119,673 B2 | 10/2006 | Eager | |
| 7,274,300 B2 | 9/2007 | Duvernell | |
| 8,136,964 B2 | 3/2012 | Hudson | |
| 8,497,761 B2 | 7/2013 | McNeill | |
| 9,777,529 B2 | 10/2017 | McNeill | |
| 10,053,904 B2 | 8/2018 | McNeill | |
| 10,113,352 B2 | 10/2018 | McNeill | |
| 2003/0007850 A1 * | 1/2003 | Belongia .............. | B65G 69/005 |
| | | | 414/401 |
| 2003/0151912 A1 | 8/2003 | Ancel | |
| 2005/0028723 A1 * | 2/2005 | Ancel .................... | G06Q 10/08 |
| | | | 116/202 |
| 2005/0031411 A1 * | 2/2005 | Hensley ................ | E01F 13/046 |
| | | | 404/11 |
| 2008/0010758 A1 * | 1/2008 | Hochstein ............ | B65G 69/287 |
| | | | 14/69.5 |
| 2010/0017125 A1 * | 1/2010 | Polad .................... | B60R 25/305 |
| | | | 701/519 |
| 2011/0203059 A1 | 8/2011 | Whitley | |
| 2012/0046809 A1 * | 2/2012 | Wellman .................. | B66F 9/24 |
| | | | 701/2 |
| 2012/0065880 A1 * | 3/2012 | Harris ...................... | G01S 1/70 |
| | | | 701/454 |
| 2013/0327914 A1 | 12/2013 | McNeill | |
| 2013/0332217 A1 | 12/2013 | McNeill | |
| 2015/0047133 A1 | 2/2015 | Sveum | |
| 2015/0375947 A1 * | 12/2015 | Hochstein .......... | B65G 69/2882 |
| | | | 348/143 |
| 2017/0044817 A1 | 2/2017 | McNeill | |
| 2019/0144218 A1 * | 5/2019 | Hoofard ............... | B65G 69/005 |
| | | | 52/173.2 |

OTHER PUBLICATIONS http://www.jamasenterprises.com/BeLight.html; May 2017; 6 pages.
https://en.wikipedia.org/wiki/Bollard; May 2017; 13 pages.
PCT Patent Application No. PCT/US2018/034377; International Search Reort and Written Opinion dated Nov. 12, 2018, 13 pages.
Pictures of Bollards; Publicly Available May 2017; 5 pages.
Pictures of Jamas Enterprises BeLight; Publicly Available May 2017; 3 pages.

* cited by examiner

US 11,040,841 B2

BOLLARD WITH INTEGRATED CONTROL SYSTEM

CROSS REFERENCE TO RELATED APPLICATIONS

This application is a national phase application of PCT Application Number PCT/US2018/034377, filed May 24, 2018, which claims the benefit of U.S. Provisional Patent App. No. 62/515,913, filed Jun. 6, 2017, which are all incorporated by reference herein in their entireties.

TECHNICAL FIELD

This invention relates generally to control systems and, more particularly, control systems for loading docks.

BACKGROUND

Loading docks include a number of devices, such as barrier operators, floor levelers, trailer locks, door locks, and lights. Each of these devices are individually controlled by designated switches, buttons, or other user interfaces. These electronic systems take up space and may be vulnerable to being damaged by heavy cargo and/or equipment. In one previous approach, a control panel having buttons for controlling multiple devices at a loading dock could be mounted to a wall near the loading dock. The control panel was exposed for ready access but could be damaged. Additionally, the installation of the control panel may be inhibited by the layout of the loading dock.

Figure 1A:
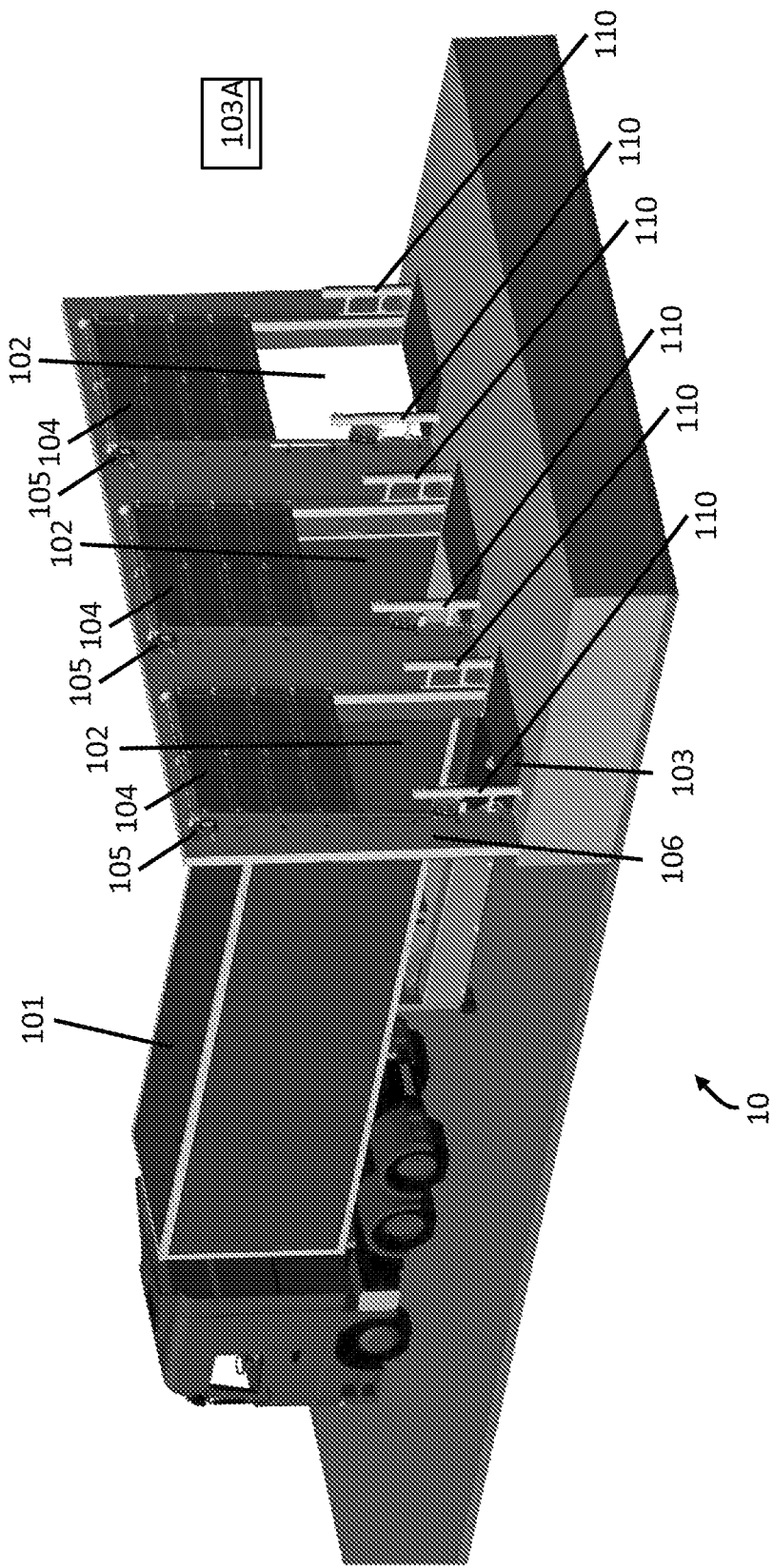
FIG. 1A is a perspective view of loading docks of a building having bollards with integrated lights and control panels.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In accordance with one aspect of the present disclosure, an integrated control panel is provided for controlling a plurality of dock devices. Example dock devices include barrier operators, barrier locks, trailer locks, floor levelers, lights, cameras, sensors, and scanners. The control panel includes a user interface having at least one user input for controlling the dock devices. The control panel has a dock device interface for sending control information to the dock devices and receiving information from the dock devices. The control panel includes a processor unit that generates the control information and receives/processes the received information.

The control panel is installed in the envelope of a bollard located at a loading dock. A bollard is a post that cordons off or protects an area or object. Bollards are often positioned offset from a wall of a loading dock and on opposite sides of a movable door of the loading dock. As used herein, the term envelope of a bollard refers to being on the bollard itself or in the area between the bollard and the wall of the loading dock. The control panel may be connected to the bollard by a mount. The mount may include, for example, a body of the control panel having a portion configured to couple directly to the bollard, a portion configured to be received in a recess of the bollard, and/or a threaded portion configured to couple to a corresponding threaded portion of the bollard. As another example, the mount includes one or more crossbars that couple to the bollard as well as a second structure, such as a nearby wall or a second bollard. Because the control panel is within the envelope of the bollard, the bollard provides protection for the control panel. The bollard may also house one or more of the dock devices, such as lights, cameras, and/or sensors. The dock device interface may include wires running through channels inside of the bollard.

In some forms, a building has a plurality of loading docks each having one or more bollard. Each loading dock may have its own integrated control panel mounted to one of the bollards. Alternatively, a single integrated control panel controls the dock devices of a plurality of loading docks.

Figure 1B:
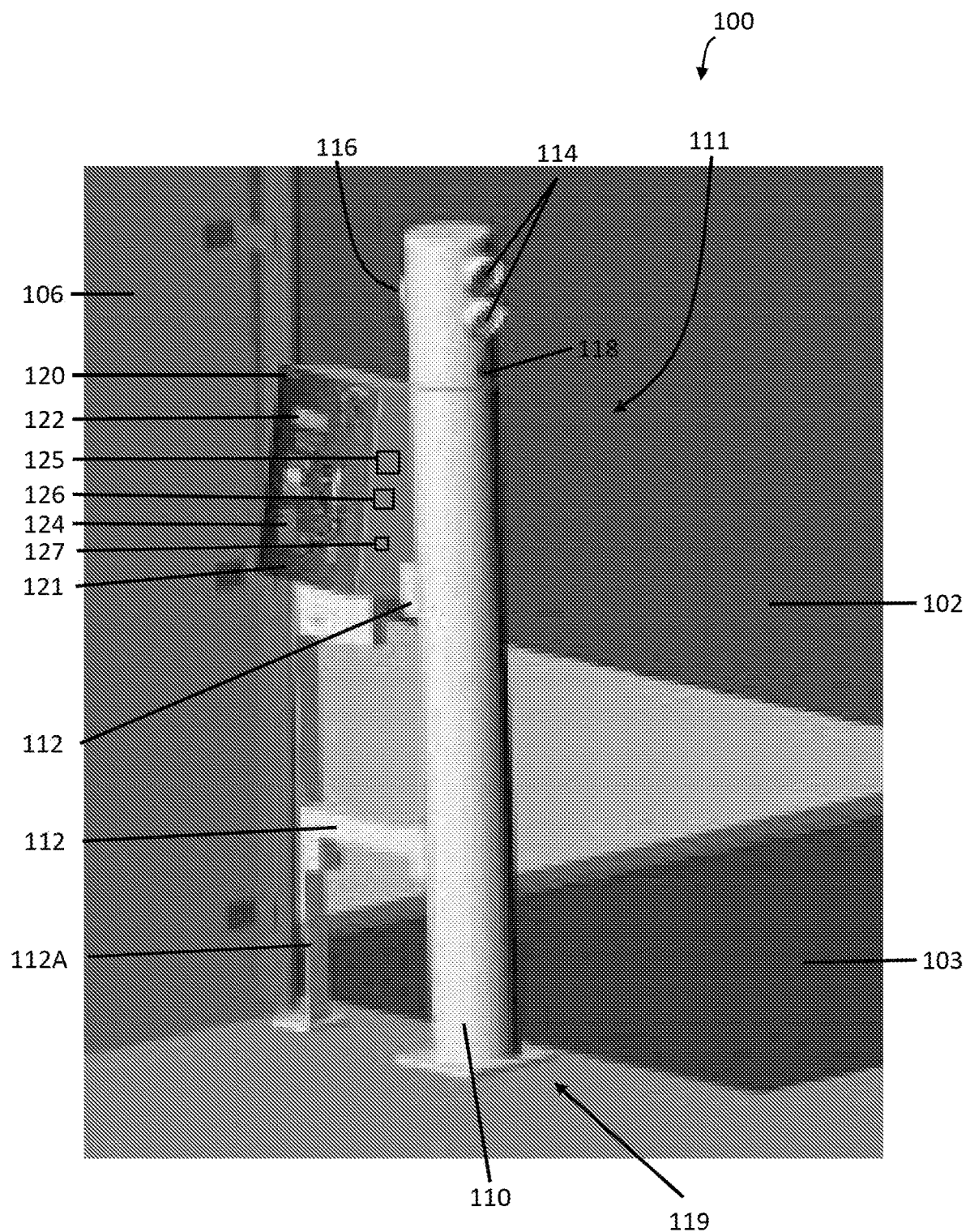
FIG. 1B is a perspective view of one of the bollards of FIG. 1A.

Referring now to FIGS. 1A-1E, a loading dock 10 is provided that includes a plurality of individual docks 102 from which trucks 101 can be loaded and/or unloaded. Each dock 102 includes a movable barrier 104 that is operable to open and close the dock 102. On the interior of the loading dock 10, the docks 102 are each flanked by a pair of bollards 110. With reference to FIG. 1B, each dock 102 further includes a floor leveler 103 operable to form a ramp into a trailer docked thereto. In some embodiments, the floor leveler 103 is controlled by a control panel. In alternative embodiments, the floor leveler 103 is manually operated. Each dock 102 is provided with a loading dock control system 100 that includes the bollards 110 flanking the door 102 and an associated control panel 120 configured to control various dock devices associated with the loading dock 102.

The bollards 110 are strong posts that may be made out of concrete and/or metal. In some embodiments they are coated with or covered with a brightly colored material, such as yellow paint or plastic to make the bollards 110 more visible. Turning to FIG. 1B, the crossbars 112 extend from one of the bollards 110 to a nearby wall 106. The crossbars 112 may be made of metal, plastic, or other suitable material. The crossbars 112 define or support channels to house wires that provide power and/or transmit data to and from the electronic devices integrated into the bollards 110.

Figure 4:
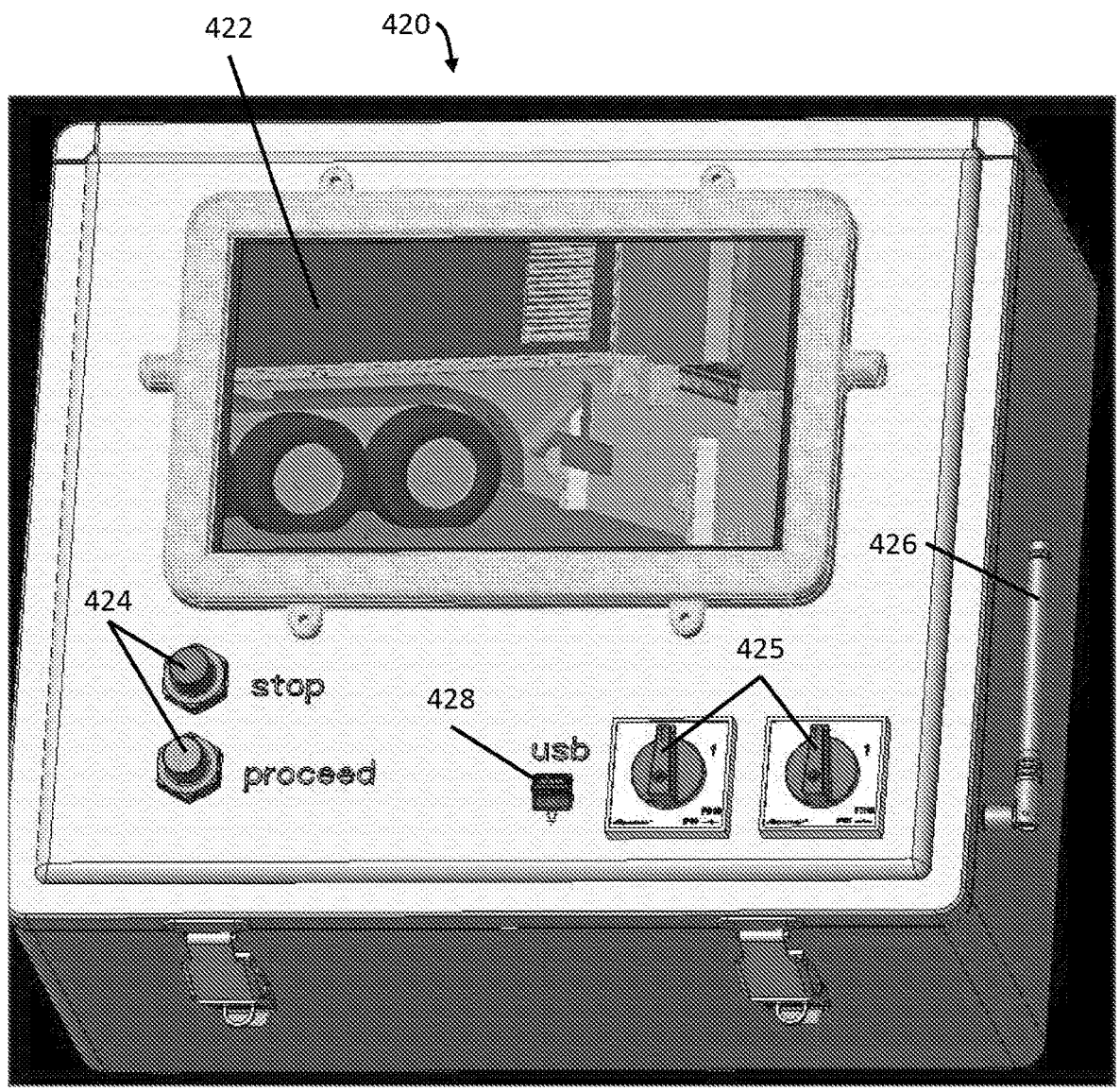
FIG. 4 is a perspective view of a control panel for a bollard.

With reference to FIG. 1B, a mount 112A connects the control panel 120 to one of the bollards 110. The mount 112A includes crossbars 112. The control panel 120 includes a user interface 121 having one or more user output devices 122 and one or more user input devices 124. The user output devices 122 can include one or more of a screen, light(s), buzzer(s), and speaker(s). The user input devices 124 can include one or more of button(s), touch screen(s), switch(es), keypad(s), and i/o port(s). The i/o port(s) may be configured to interface with an external device to transmit and/or receive information (such as a USB port). An exemplary control panel with user interface 420 is illustrated in FIG. 4 and described below.

The user input devices 124 generally include one or more buttons for operating a movable barrier operator 105 that controls the position of the barrier 104 and/or one or more buttons for controlling the floor leveler 103. The user input device 124 may include a security device, such as a card reader or RFID sensor, so that only authorized persons can operate the barrier 104 and/or the floor leveler 103. The control panel 120 may also include an internal timer and data storage unit.

In some forms, the control panel 120 further contains a processor device 125 that receives data from the user input devices 124 and a plurality of sensors. The processor device 125 processes the received data and operates the barrier 104. Operating the barrier 104 involves communicating with the barrier operator 105 and operating the barrier lock 132 (see FIG. 1D). In some embodiments, the processor device 125 additionally outputs data to a remote data storage unit 103A, such as an onsite computer or a server of a cloud storage system. The data is transmitted over wires housed in the crossbars 112 or wirelessly via a transmitter in the control panel 120. The wireless transmitter of the control panel 120 may include one or more of a Bluetooth® transmitter, radio frequency (RF) transmitter, WiFi transmitter, or other transmitter that transmits data to other devices directly or indirectly, such as via a wireless router.

The internal computing components (e.g., processor 125, memory 126, timer 127, etc.) and/or user interface 121 may be integrated into the bollard 110 at the time the bollard 110 is manufactured before and installation in a loading dock environment. In another form, the bollard 110 is manufactured with one or more recesses in which the various electronic elements and/or a user interface 121 can be placed by the installers. The recesses are in communication with the mounts of the bollard 110 onto which the crossbars 112 attach. The installer may advance wiring through one or more channels or one or more of the crossbars 112 to connect the control panel 120 with the devices associated with the dock 102.

Figure 1C:
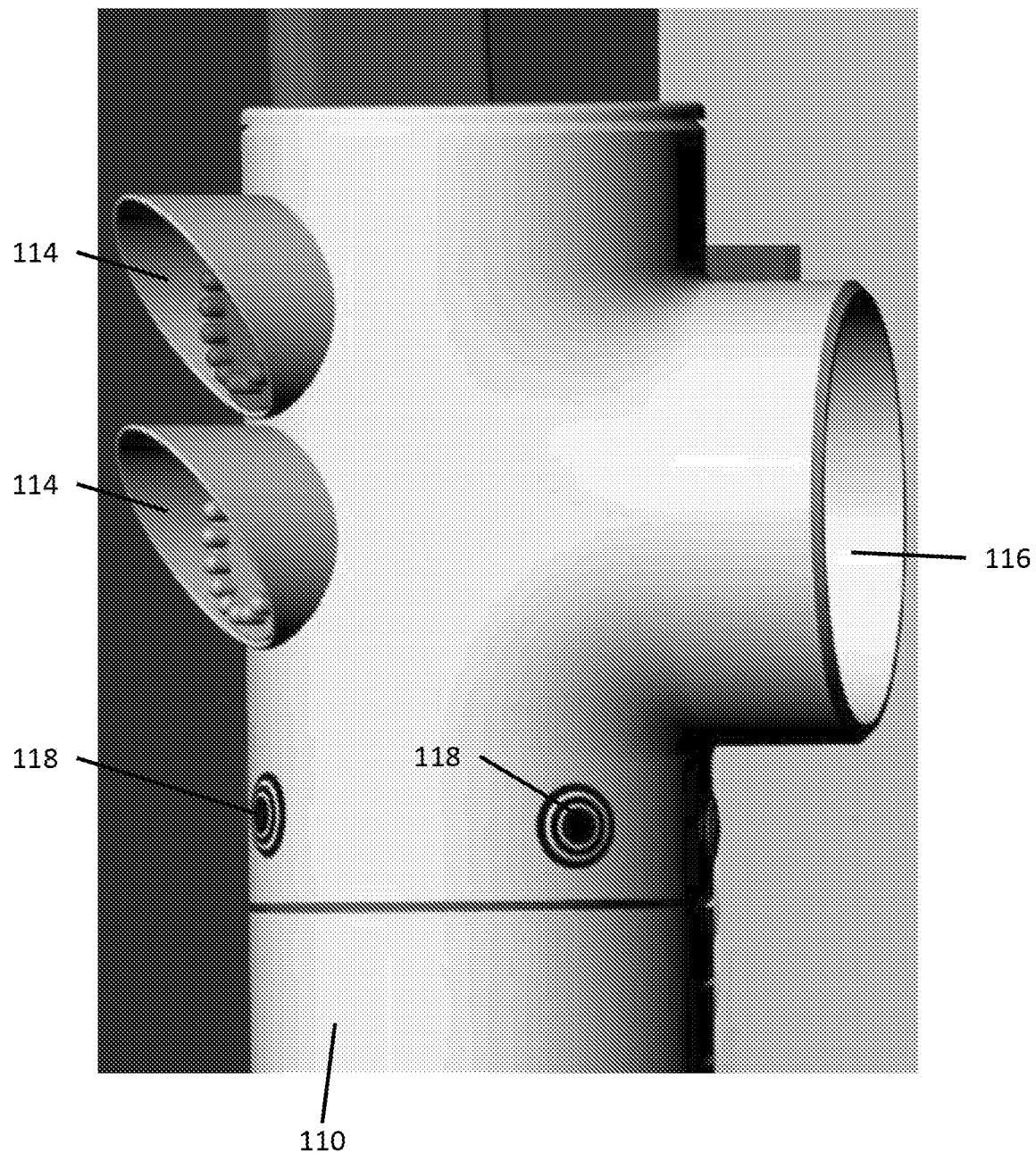
FIG. 1C is a side view of an upper end of the bollard of FIG. 1B taken from the opposite side of the bollard from FIG. 1B.

With reference to FIGS. 1B and 1C, the bollard 110 has an upper portion 111 with one or more indicator lights 114 and a lower portion 119 configured to be mounted to a floor of the loading dock 102. The processor device 125 operates the indicator lights 114 based on data from sensors associated with the dock 102. The indicator lights 114 are colored lights used to indicate a certain status. In some embodiments, the indicator lights 114 include a green light for indicating that a trailer is secured to the loading dock 10 at the corresponding dock 102 and a red light for indicating that there is not a trailer secured to the loading dock 10 at the corresponding dock 102. The indicator lights 114 are oriented to direct light inwards, away from the barrier 104 and towards the interior of the dock 10, to increase visibility by workers working inside the loading dock 10. The upper portion 111 of the bollard 110 further includes a flood light 116. The flood light 116 is a directional light positioned to illuminate the inside of a trailer docked at the corresponding dock 102. In some embodiments, the flood light 116 is communicably coupled to the control panel 120 and/or one or more sensors such that the flood light 116 is automatically turned on when certain conditions are met (e.g., the barrier 104 is at an open position, a trailer is secured at the corresponding dock, and/or a worker working in the trailer). In another form, the flood light 116 is operated by a switch either on the control panel 120 or located on or near the bollard 110.

One or more cameras and/or sensors 118 are positioned at or near the upper portion 111 of the bollard 110. The sensors 118 may include motion sensors to detect when a person and/or piece of equipment (e.g., a forktruck) is operating in the trailer or area directly outside of the trailer. The data from the sensor 118 may be used by the control panel 120 to operate lights and/or indicators such as the flood light 116. The data may further be used by the control panel 120 in the operation of certain other devices. For example, the control panel 120 may not direct the barrier operator 105 to close the barrier 104 or operate the trailer securing mechanism 140 to unhook the trailer when a person is in or near the trailer.

Alternatively or additionally, the sensors 118 include one or more cameras directed towards the interior of the trailer. Data from the cameras are transmitted to the remote storage device 103A for storage. The data from the cameras may also be transmitted to a remote security station where a plurality of trailers can be monitored via live video stream. One or more of the cameras can be used as sensors (e.g., motion sensors) instead of or in addition to recording video. In some forms, when motion is detected by the cameras the control panel 102 activates a warning light indicating to others that someone is inside of the trailer and/or that the trailer is moving.

Figure 1D:
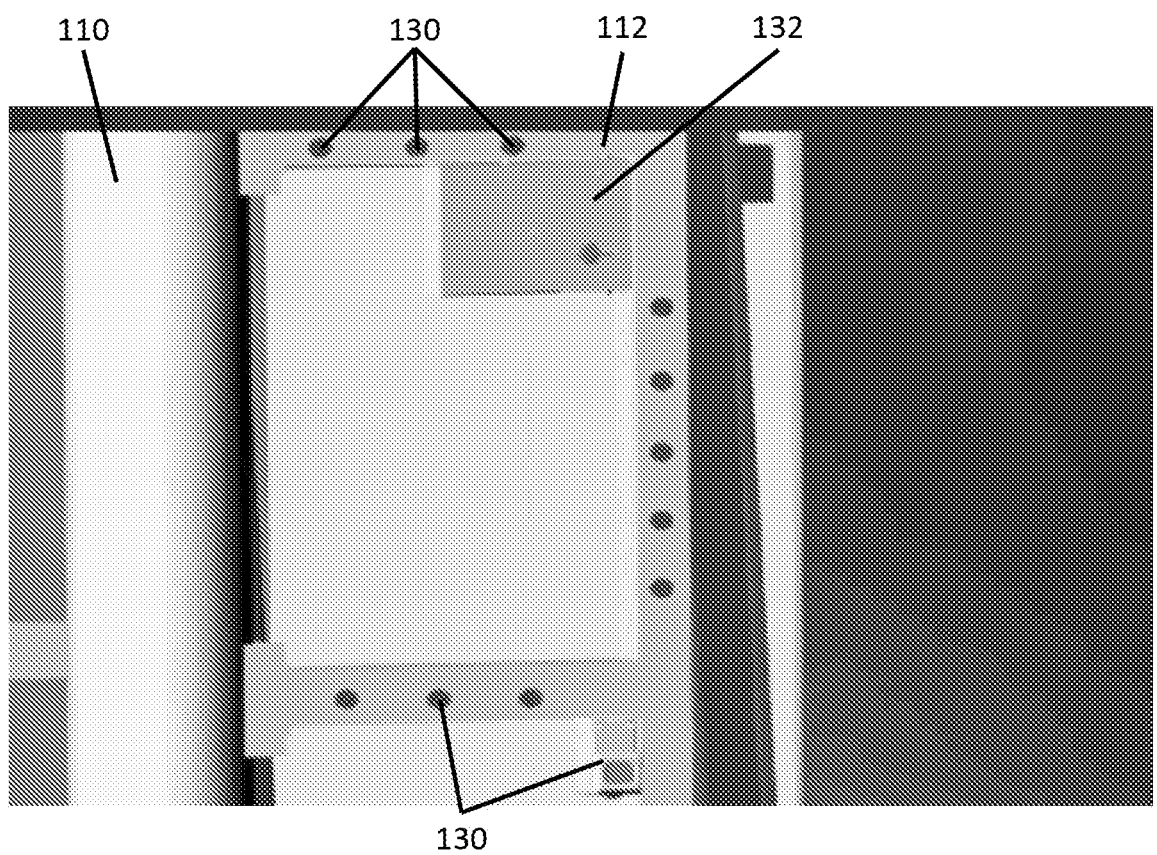
FIG. 1D is a side view of a portion of the bollard of FIG. 1B.

With reference to FIG. 1D, a plurality of additional sensors 130 are mounted along the inner facing surface of the bollard 110 and/or crossbars 112. The sensors 130 may include a plurality of different sensors based on the application. Example sensors include proximity sensors to detect the proximity of objects to the crossbars 112. The proximity sensors are operably coupled to an indicator, such as a light or buzzer, to alert a driver when they get to close to the bollard 110 and/or crossbars 112 with their forklift. The sensors 130 can further include product sensors to monitor items moving in to and out of the trailer. The product sensors may be one or more of RFID sensors or bar code scanners configured to detect corresponding RFID chips or bar codes in or on products or boxes that are moved through the dock 102. The sensors 130 may additionally include an RFID sensor or bar code scanner configured to detect and identify the truck docked to the dock 102. The sensors 130 may also include lytro light field cameras, 3D cameras, holofect devices, ultrasonic sensors, laser sensors, photo electronics, and power circuit protection sensors. In some embodiments, such as refrigerated loading docks 10, the sensors 130 may include temperature and/or humidity sensors.

The product sensors transmit data via the control panel 120 to the remote data storage unit 103A. The data is used to track inventory, confirm shipment, and/or monitor for theft/loss. In some embodiments, the control panel 120 includes a storage unit with a preloaded list of products to be unloaded from or loaded onto the truck 101. The control panel 120 cross references products detected by the product sensors with the stored list and outputs via the user outputs 122 and/or indicators when the list is fulfilled and/or when a product not on the list is detected. By this real time monitoring, mistakes in loading and unloading of trucks 101 can be reduced.

The sensors 118, 130 described above are communicably coupled to the control panel 120. The communicable coupling can be via, for example, wired connection through the wires running within the crossbars 112 or wirelessly via Bluetooth, WiFi, radio frequency, or another short range wireless communication protocol.

Figure 1E:
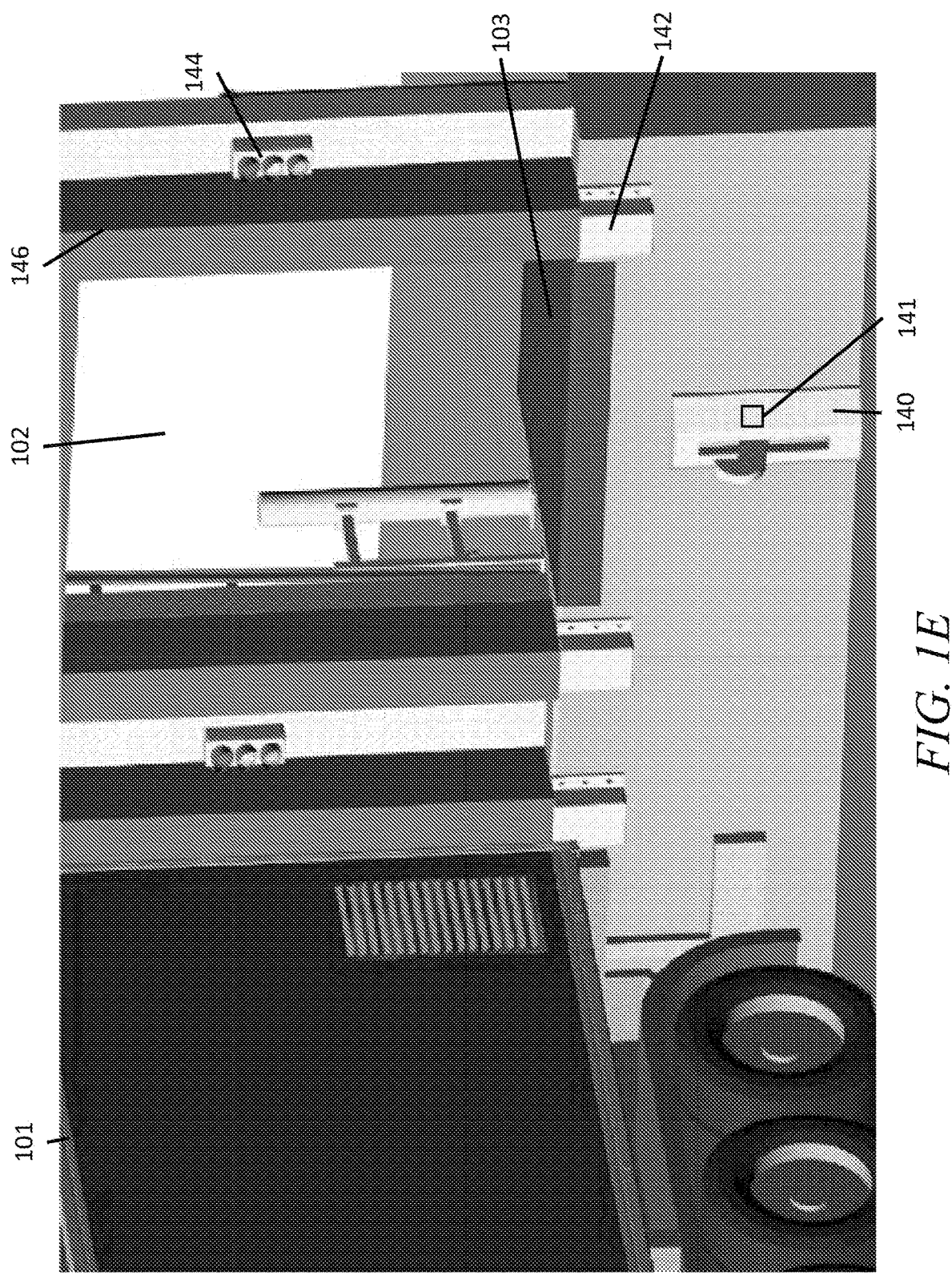
FIG. 1E is a perspective view of the exterior of one of the loading docks of FIG. 1A.

The control panel 120 communicates with a plurality of devices on the outside of the dock 102 as shown in FIG. 1E. On the outside of the dock 102 there is a trailer securing mechanism 140 operable to secure a trailer to the loading dock 10. In some embodiments, the trailer securing mechanism 140 comprises a hook that is movable to couple to the trailer of the truck 101. In alternative embodiments, the trailer securing mechanism 140 comprises one or more blocks or structures operable to block the front of one or more tires of truck 101. Bumpers 142 on the outside of the dock include integrated pressure and/or proximity sensors to detect when a trailer is nearby and/or in position. Data from the sensors are used in the operation of the trailer securing mechanism 140 and by the indicators 144. The indicators 144 include one or more lights oriented to be visible by a driver of a truck 101. The lights indicate to the driver if the trailer is in position and, in some embodiments, if the truck is near position. The indicators 144 may comprise a first light activated when the trailer is in position to indicate to the driver to stop, a second light activated when the trailer is near position to indicate to the driver to slow down, and a third light activated when no trailer is detected nearby indicating to the driver to approach at their normal speed. The indicators 144 may additionally or alternatively include a light indicating the position of the trailer securing mechanism 140 to prevent drivers from trying to pull away when the trailer is secured. Once the trailer is in position, an inflatable seal 146 is inflated to form a seal between the perimeter of the dock 102 and the trailer. The exterior devices communicate with the control panel 120 via wired connection or via wireless connections.

With reference to FIGS. 1A-1E, a method of operating the loading dock controlling apparatus 104 is provided. First, a truck 101 arrives at a terminal including the loading dock 10. When entering the terminal, the truck 101 is identified, and the time it arrived is transmitted to the remote data storage unit 103A. The truck is assigned a dock 102. The truck 101 is assigned to input into the control panel 120 either by a remote input (such as a computing device at the gate to the facility or a central computing device) or by an operator via the user input device 124. The control panel 120 operates one of the indicators 144 to indicate to the driver which dock 102 to approach.

With reference to FIG. 1E, the driver backs the truck 101 towards the dock 102 until the trailer of the truck 101 contacts the bumper 142. Sensors in the bumper 142 detect that the trailer has contacted the bumper 142 and transmit data indicating the contact to the control panel 120. The control panel 120 operates one of the indicators 144 to indicate to the driver to stop. The control panel 120 also activates the trailer securing mechanism 140 to secure the trailer of the truck 101 to the dock 102. In some embodiments, the control panel 120 automatically activates the securing mechanism 140; in other embodiments, an operator inputs commands at the control panel 120 to operate the securing mechanism 140. Once the securing mechanism 140 has secured the trailer, a sensor 141 integrated into the securing mechanism 140 asstransmits data to the control panel 120 indicating that the trailer is secured. The control panel 120 then operates the inflatable seal 146 to seal the gap between the trailer and the dock 102. Once the trailer is secured and sealed, the control panel 120 activates the indicators 114 to indicate to workers inside the loading dock 10 that the trailer is attached. The control panel 120 further transmits data to the remote data storage unit 103A indicating the time at which the trailer was docked. Each of the operations of the control panel 120 discussed above may be automated and performed in response to information received from the various devices and sensors described herein.

Once the trailer is secured and sealed, the barrier 104 can be unlocked and moved to an open position to open the dock 102 to the trailer. In some embodiments, the control panel 120 automatically operates the movable barrier operator 105 to move the barrier 104 once the trailer is secured and sealed. In alternative embodiments, an operator inputs a command to the control panel 120 to operate the barrier 104. In some embodiments, the control panel processes data from sensors 130 and/or camera 118 to ensure that the area directly surrounding the barrier 104 is free of obstructions before operating the barrier 104. Once the barrier 104 is opened, the control panel 120 activates the flood light 116 to illuminate the inside of the trailer.

Some trailers include a door that must be manually opened once the barrier 104 is opened to access the contents of the trailer. The ramp, or door leveler 103, can then be extended to form a smooth path from the loading bay floor to the floor of the trailer. Once the control panel 120 detects that the floor is leveled, the control panel 120 operates the indicators 114, such as by switching off the red light and switching on the green light, to indicate to forktruck drivers that the trailer is safe to enter.

The material is unloaded from the trailer and/or loaded into the trailer. The sensors 130 and/or camera 118 monitor the material being moved. Once the trailer is fully loaded or unloaded, the forklift is removed from the area directly inside of the dock 102 opening, which is verified by the sensors 130 and/or the camera 118 acting as a sensor. Once the control panel 120 detects that the area is clear, the control panel 120 retracts the floor leveler 103. If applicable, an operator manually closes the trailer door once the floor leveler 103 is retracted. Once the sensors 130 and/or camera 118 indicate that the area surrounding the dock 102 is clear, the barrier 104 can be closed. An operator inputs commands to the control panel 120 to close the barrier 104 and, if the control panel 120 determines the area surrounding the dock is clear, the control panel 120 operates the barrier operator 105 to move the barrier 104 into the closed position thereof.

Once the barrier 104 is moved to a closed position, the control panel 120 operates the seal 146 and the securing mechanism 140 to decouple the trailer from the dock 102. Once decoupled, the control panel 120 operates the indicators 142 to indicate to the driver that the truck 101 can be safely pulled away from the dock 102. The sensors in the bumper 144 detect when the trailer has pulled away and transmit data indicating the departure of the truck 101 to the control panel 120. The control panel 120 transmits the time at which the truck 101 leaves to the remote storage unit 103.

As discussed above, the control panel 120 may timestamp and transmit data from the various sensors at various points and/or continuously throughout the process. This includes, but is not limited to, video from the cameras 118 and/or product information from the product sensors 130.

Figure 2:
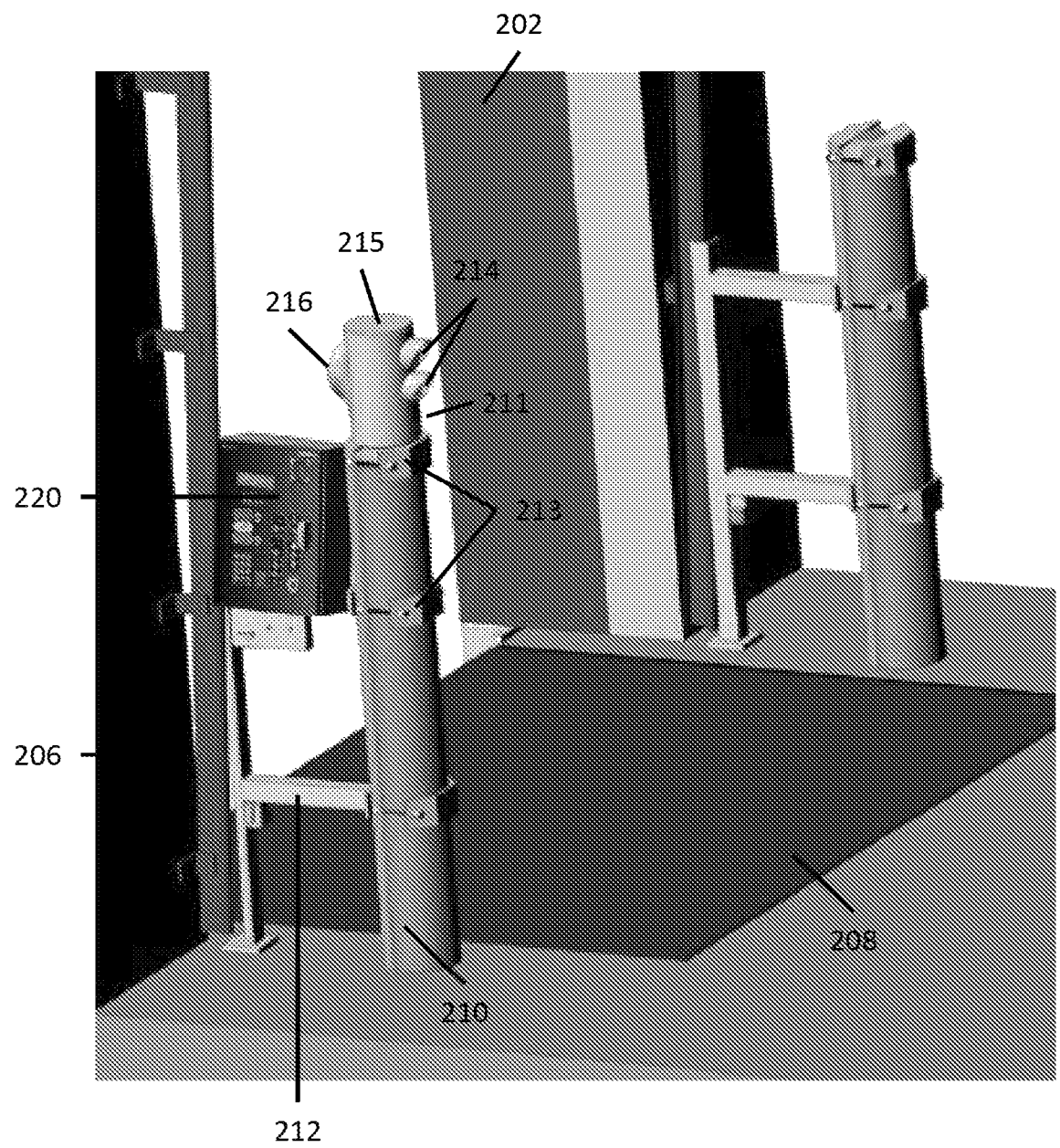
FIG. 2 is a perspective view of a loading dock having a bollard retrofit with a control panel and lights.

With reference to FIG. 2, a retrofit control system 200 is provided for attachment to existing bollards 210. The retrofit control system 120 includes metal crossbars 212 coupled to the bollard 210 by securing mechanisms 213. The securing mechanisms 213 may include clamps for engaging exterior surfaces of the bollard 210. The retrofit control system 200 is configured to attach to solid bollards 210, such as concrete bollards. The crossbars 212 support a control panel 220 that is similar in many respects to the control panel 120 discussed above. One or more upper illumination assemblies 215 containing a flood light 216 and indicator lights 214 attach to the upper portion 211 of one or both bollards 210 flanking a dock 202. Once coupled to the bollards 210, the control system 200 operates in substantially the same manner as the control system 100 of the loading dock 10 described above. Any of the sensors, indicators, and other devices described with respect to the control system 100 may be included in the retrofit control system 200.

In some forms, the control panel 220 is attached directly to the bollard 210 instead of being attached to the bollard 210 by the crossbars 212. As with the bollard 110 discussed above, the bollard 210 may be at least partially hollow, such that the processor, memory, user interface, and/or other components of the control panel 220 can be positioned in the bollard 210 so as to provide additional protection. In another form, the bollard 210 may include recesses into which the control panel 220 and/or the user interface thereof can be installed. In yet another form, the bollard 210 is solid with no such hollow cavity or recess. In this form, the control panel 220 may be configured to attach to the bollard 210, such by being integrated into the upper illumination assembly 215.

The control system 200 may include crossbars 212 and associated security mechanisms 213 for each bollard 210. An installer may then connect the control panel 220 to either of the bollards 210. This provides additional flexibility for an installer.

Figure 3:
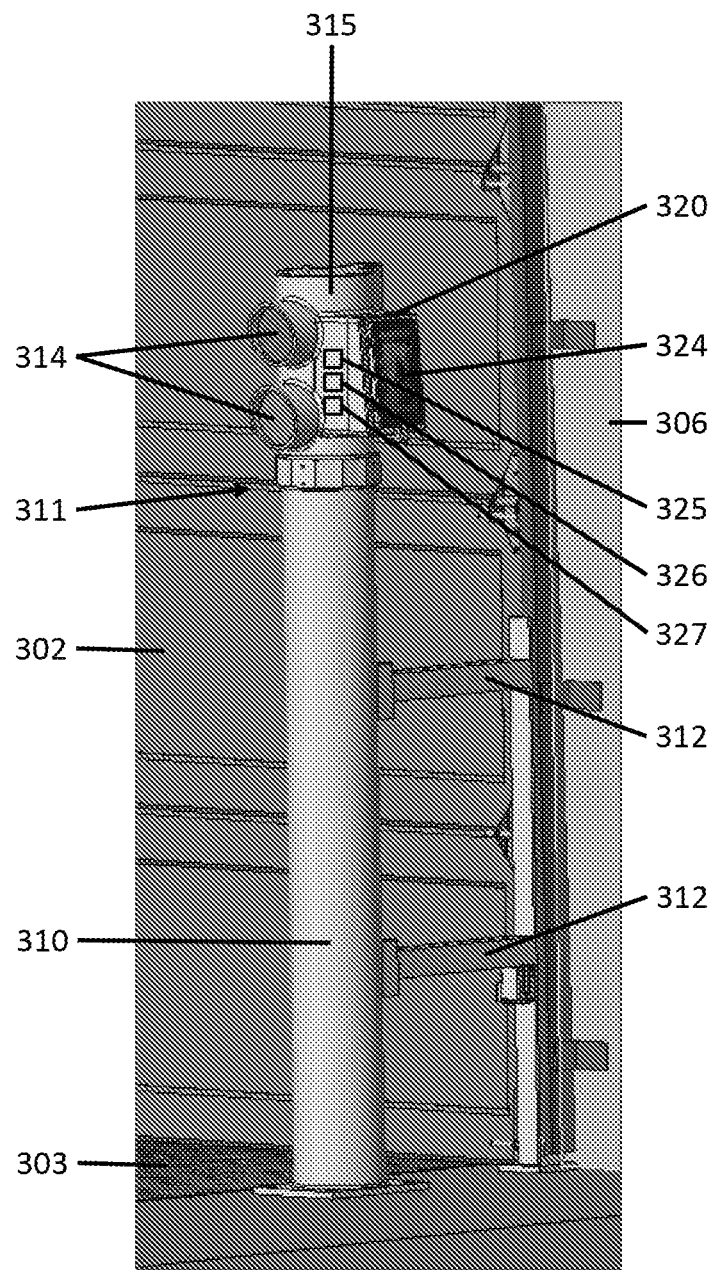
FIG. 3 is a perspective view of a bollard with integrated lights and a control panel.

While control systems 100 and 200 show control panels 120, 220 configured to be attached to bollards 110, 210 by crossbars 112, 212, the control system 300 includes an illumination and control assembly 315 that includes a control panel 320 as shown in FIG. 3. A mount 311 of the illumination and control assembly 315 mounts the control panel 320 above a bollard 310. The illumination and control assembly 315 houses indicator lights 314 and the control panel 320. In some forms, the illumination and control assembly 315 further includes one or more sensors, cameras, and/or flood lights as discussed above in systems 100 and 200. The control panel 320 may be smaller than the crossbar-mounted control panels 120, 220 so as to better fit on the bollard 310. The control panel 320 includes a user interface 324 that serves as both an output and an input. The control panel 320 additionally or alternatively includes speakers, buttons, switches, or other input/output devices as described above.

The processor includes a device 325, a timer 326, and a data storage unit 327. The rigidity of the bollard 310 elevates and protects the illumination and control assembly 315 and its components from damage resulting from collisions or other hazards associated with loading bays. The control panel 320 is electrically coupled to the other loading dock devices by wires running through the crossbars 312. The wires may include power supply and/or data wires. In some forms, a user interface including user input and output devices may be located on the crossbar 312 and communicatively coupled to the illumination and control assembly 315 via wired or wireless communication. The user input and output devices may comprise one or more buttons or switches and associated indicator lights or may comprise a more complex system such as a keypad, screen, and/or a touchscreen or other input and output devices described herein.

In other forms, the user interface 324 is located on and/or supported by the bollard 310 or by the crossbars 312 extending therefrom. Similar to above, the user interface 324 may include one or more switches and indicator lights, a screen, a keypad or touchscreen, or other inputs and outputs described herein. The user interface 324 may be located on the top or on the side of the bollard 310. In a preferred form, the user interface 324 is at least partially located within a recess of the bollard 310 so as to provide additional protection.

FIG. 4 illustrates a control panel 420 that may be utilized in the control systems 100, 200, 300 described herein. The control panel 420 includes a screen 422, one or more buttons 424, and one or more dials 425. In one form, the screen 422 is a touchscreen. The buttons 424 and dials 425 are input devices configured to enable a user to control the control system. The buttons 424 are binary inputs, for example to control the barrier operators to move the barrier of the dock. The dials 425 are analog inputs that can select between a plurality of options, such as switching between modes and/or switching camera feeds displaced on the screen 422.

In some forms, the control panel 420 further includes an antenna 426. The antenna 426 receives and/or broadcasts signals enabling the control panel 420 to wirelessly communicate with other devices. The control panel further includes an I/O port, such as a USB port 428. The USB port 428 receives a USB cable or USB drive to transfer data to or receive data from the control panel 420. In one example, the USB port 428 is used to load code into the control panel 420 configured to control the operation of the dock. As another example, a computing device can be connected to the control panel 420 via the USB port 428 to download stored data collected by the sensors described above.

Figure 5:
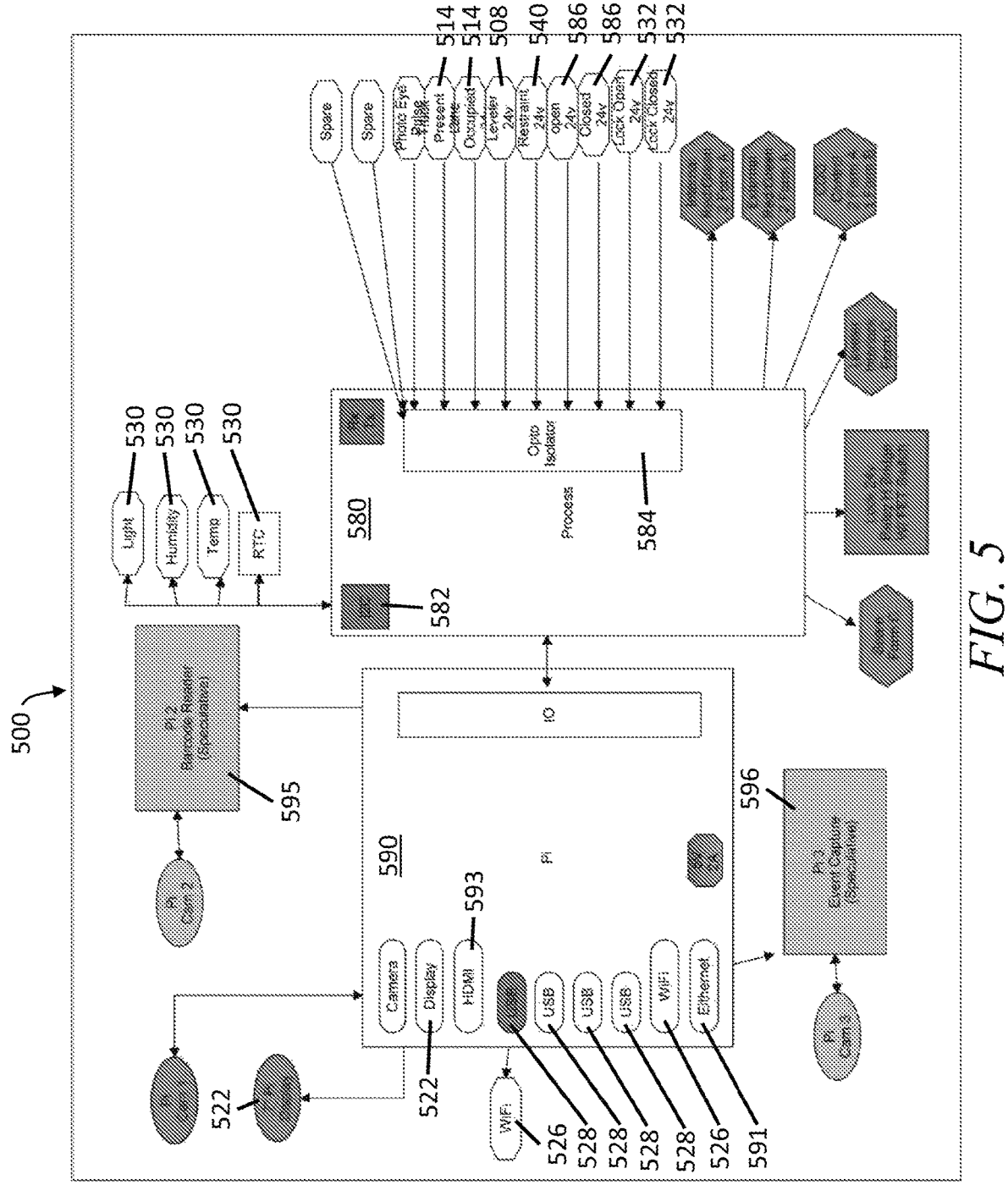
FIG. 5 is a schematic diagram of a control panel.

FIG. 5 illustrates an exemplary block diagram of a control system 500, such as the control systems 100, 200, 300 described herein. The control system 500 includes an input/output module or IO 590 communicatively coupled to a processor 580.

The IO 590 has a plurality of input and/or output devices including, for example, USB ports 528, a wireless card 526, ethernet port 591, HDMI port 593. In a preferred embodiment, the wireless card 526 is configured to communicate over standard WiFi. In other forms, the wireless card 526 communicates over a different wireless communication protocol such as Bluetooth®, infrared, ZigBee, etc. The IO 590 is additionally communicatively coupled to other inputs including a barcode reader 595, the screen 522, and/or an event capture camera 596.

The IO 590 is communicatively coupled to peripheral dock devices, such as the sensors, barrier operators, indicators, and other devices described herein, by a dock device interface 591. The dock device interface 592 is a means of communication, such as a bus or a wireless network, over which data is transmitted between the IO 590 and the dock devices. In one form, the dock device interface 592 includes one or both of the wireless card 526 and a wired connection, such as the ethernet port 591.

The IO 590 is controlled by a processor 580. The processor 580 receives inputs form the IO 590 and controls the attached devices based on those inputs. In one form, the processor has an opto-isolator 584 used to power the connected devices. Through the opto-isolator 584, the processor 580 controls the indicator lights 514, floor leveler 508, trailer restraints 546, barrier operator 586, barrier locks 532, and other devices.

In some forms, the processor 580 is communicatively coupled to one or more peripheral sensors 530 by an inter-integrated circuit. The peripheral sensors 530 can include one or more of light sensors, humidity sensors, or temperature sensors as discussed above. The readings from the sensors are used by the processor 580 to control the attached devices. The readings from the sensor may be sent by the processor 580 to the IO 590 to be output to a user.

The processor 580 runs one or more codes to automate the control methods described above. The processor 580 outputs commands to dock devices in a preprogrammed sequence according to data received. For example, the processor 580 receives data from the bumper 142 indicating that a trailer is in position in the dock 102. The processor 580 then outputs commands to the securing mechanism 140 to move the hook upward to secure the trailer. Once data is received from the sensor 141 of the securing mechanism 140 indicating that the securing mechanism 140 is in a secured position, the processor 580 outputs a command to the seal 146 to form a seal with the trailer. The automated sequence may continue with or without user input to operate the other dock devices, such as the barrier operator 105 and/or the floor leveler 103.

Figure 6:
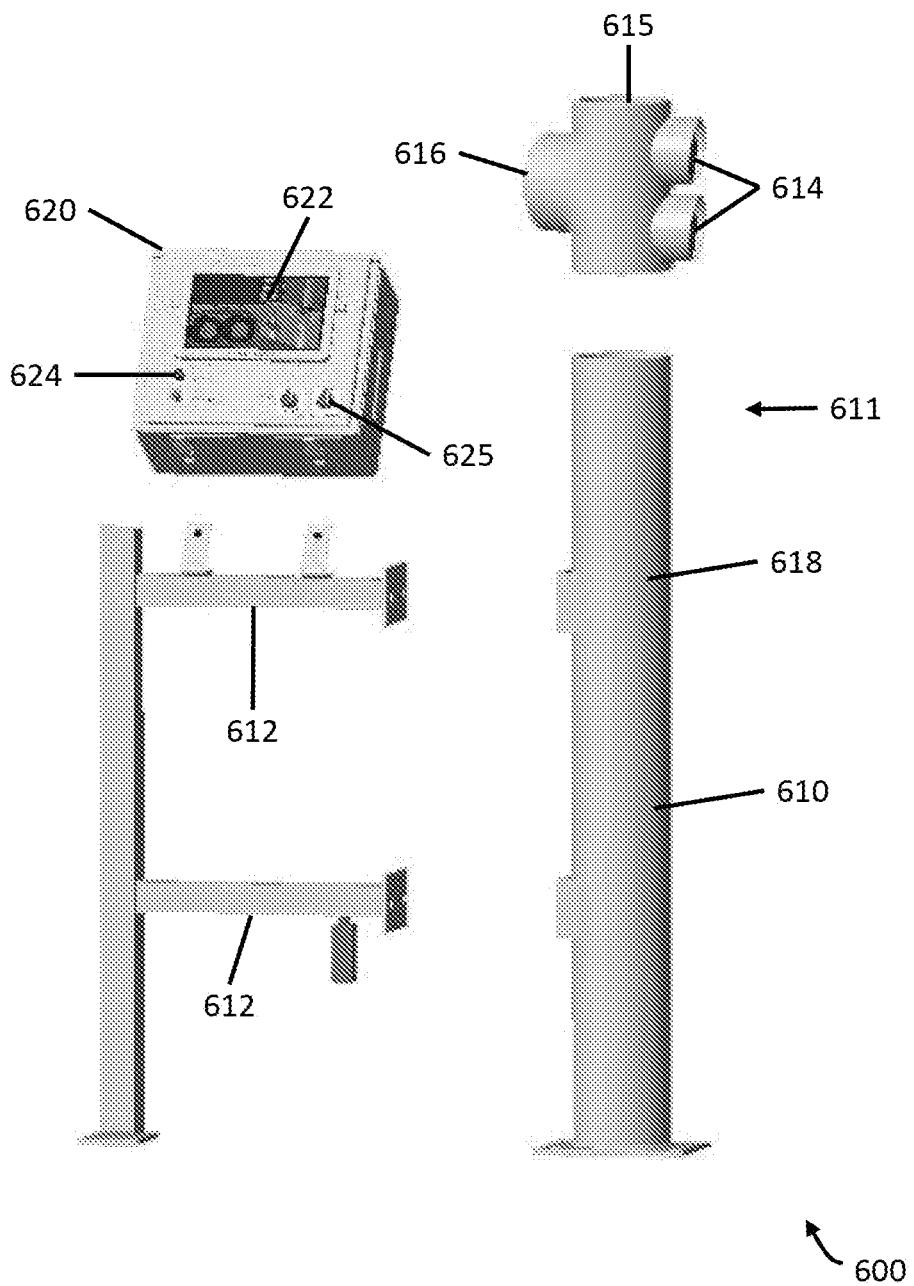
FIG. 6 is an exploded view of a bollard retrofit kit showing a light assembly for being connected to an upper end portion of the bollard, a mount for connecting to the bollard, and a control panel for being supported by the mount.

FIG. 6 illustrates a control system 600 configured to attach to a hollow bollard 610. The control system 600 includes an illumination assembly 615 having indicator lights 614 and a flood light 616. The illumination assembly 615 is configured to attach to an upper end portion 611 of the bollard 610, with wires from the lights 614/616 extending down through the hollow center of the bollard 610. The illumination assembly 615 can use one of a variety of attachment means to couple to the upper end portion 611 of the bollard 610 including, for example, welding, screws, bolts, clamps, adhesive, friction fit, or threaded attachment.

Crossbars 612 attach to the side of the bollard 610. As shown, at least one of the crossbars 612 is hollow and includes an inner passway. When the crossbar 612 is coupled to the bollard 610, the inner passway of the crossbar 612 lines up with a corresponding hole in a sidewall 618 of the bollard 610 such that wires can run from the interior of the crossbar 612 into the interior of the bollard 610. The crossbars 612 can use one of a variety of attachment means to couple to the bollard 610 including, for example, welding, screws, bolts, clamps, adhesive, friction fit, or threaded attachment.

A control panel 620 mounts to one or both of the crossbar (s) 612. The crossbars 612 may have an additional hole near the control panel 620. This allows wires from the control panel 620 to extend from the control panel 620, through the inner passway of the crossbar 612, and into the interior of the bollard 618. The control panel 620 is substantially similar to the control panel 420 described above.

Element numbers in the above embodiments are all three digit numbers. The first digit corresponds to the figure number in which the element appears. The last two digits refer to the element. Elements in different embodiments having the same last two digits are assumed to operate in the same manner except where expressly distinguished.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A control system for a loading dock having a plurality of dock devices, the control system comprising:
 a control panel to control the plurality of dock devices;
 an illumination assembly configured to be positioned on a top of a bollard at the loading dock, the illumination assembly configured to be communicatively coupled to the control panel;
 a mount configured to connect the control panel to the bollard, the mount including an elongate crossbar with a first end portion and a second end portion opposite the first end portion, the first end portion configured to be secured to a side of the bollard and the second end portion configured to be secured in a second structure so that the crossbar extends intermediate the side of the bollard and the second structure for supporting the control panel between the second structure and the side of the bollard; and
 at least one sensor supported by the mount;
 wherein the at least one sensor includes a first sensor oriented to monitor an interior of a trailer at the loading dock and a second sensor oriented to monitor an area outside of the trailer.

2. The control system of claim 1 wherein the control panel is configured to receive information from one of the dock devices and to operate another one of the dock devices in response to the received information.

3. The control system of claim 1 wherein the illumination assembly comprises at least one indicator light.

4. The control system of claim 1 wherein the control panel comprises a user input and a processor unit, wherein the control panel is configured to control a barrier operator based at least in part on data the processor unit receives from the user input and the at least one sensor.

5. The control system of claim 1 wherein wires connected to the control panel extend through an internal passageway of the crossbar.

6. The control system of claim 1 further comprising the plurality of dock devices, the dock devices including at least one of a movable barrier operator, a floor leveler, an indicator light, a flood light, a trailer securing mechanism, a bumper sensor, and a sealing mechanism.

7. The control system of claim 1, wherein the control panel is configured to communicate with at least one of the plurality of dock devices wirelessly.

8. The control system of claim 1, wherein the illumination assembly is communicatively coupled to the control panel by wires extending through an internal passageway of the crossbar and extending through a cavity in the bollard.

9. The control system of claim 1 wherein the at least one sensor is supported by the elongate crossbar of the mount.

10. The control system of claim 1 wherein the mount includes a plurality of elongate crossbars including the elongate crossbar, wherein the at least one sensor is supported by one or more of the plurality of elongate crossbars.

11. The control system of claim 1 wherein the at least one sensor includes a camera.

12. The control system of claim 1, wherein the at least one sensor includes a product sensor.

13. The control system of claim 1, further comprising a barrier lock supported by the mount, the barrier lock configured to be communicatively coupled to the control panel.

14. The control system of claim 1 wherein the control panel is configured to control a movable barrier operator.

15. The control system of claim 1, wherein the at least one sensor includes a proximity sensor.

16. The control system of claim 1 wherein the at least one sensor is configured to be communicably coupled to the control panel.

17. The control system of claim 16 wherein the at least one sensor includes at least one of an RFID sensor and a bar code scanner configured to identify objects moving through the loading dock.

18. The control system of claim 1 wherein the control panel comprises a transmitter and a memory unit.

19. The control system of claim 18 further comprising a remote storage unit configured to receive data transmitted by the transmitter.

20. A control system for controlling a plurality of dock devices at a loading dock, the control system comprising:
   a mount configured to connect to a bollard;
   a control panel configured to be connected to the mount, the control panel comprising:
      a user interface having at least one user input for controlling the dock devices;
      a dock device interface adapted to receive information from the dock devices and transmit control information to the dock devices; and
      a processor unit operatively coupled to the user interface and the dock device interface, the processor unit being operable to control the dock devices via the dock device interface;
   an illumination assembly configured to be positioned on a top of the bollard, the illumination assembly configured to be communicatively coupled to the control panel; and
   at least one sensor of the illumination assembly, wherein the at least one sensor includes a first sensor oriented to monitor an interior of a trailer at the loading dock and a second sensor oriented to monitor an area outside of the trailer;
   wherein the mount includes an elongate crossbar having a first end portion and a second end portion opposite the first end portion, the first end portion configured to be secured to a side of the bollard and the second end portion configured to be secured to a second structure so that the crossbar extends intermediate the side of the bollard and the second structure for supporting the control panel between the second structure and the side of the bollard.

21. The control system of claim 20 wherein the illumination assembly is communicatively coupled to the control panel by wires extending through an internal passageway of the mount and extending through a cavity in the bollard.

22. The control system of claim 20 wherein the processor unit is configured to receive information from one of the dock devices and to operate another dock device in response to the received information.

23. The control system of claim 22 wherein the processor unit is configured to receive information from the one dock device and to operate a plurality of other dock devices in response to the received information.

24. The control system of claim 20 wherein the illumination assembly includes a housing for housing the at least one sensor and at least one light source.

25. A control system for a loading dock having a plurality of dock devices, the control system comprising:
   a control panel to control the plurality of dock devices;
   an illumination assembly configured to be positioned on a top of a bollard at the loading dock, the illumination assembly configured to be communicatively coupled to the control panel;
   a mount configured to connect the control panel to the bollard, the mount including an elongate crossbar with a first end portion and a second end portion opposite the first end portion, the first end portion configured to be secured to a side of the bollard and the second end portion configured to be secured to a second structure so that the crossbar extends intermediate the side of the bollard and the second structure for supporting the control panel between the second structure and the side of the bollard; and
   a barrier lock supported by the mount, the barrier lock configured to be communicatively coupled to the control panel.

26. The control system of claim 25 wherein the control panel is configured to receive information from one of the dock devices and to operate another one of the dock devices in response to the received information.

27. The control system of claim 25 further comprising at least one sensor supported by the mount.

28. The control system of claim 27 wherein the at least one sensor includes at least one of an RFID sensor and a bar code scanner configured to identify objects moving through the loading dock.

29. The control system of claim 27 wherein the control panel comprises a user input and a processor unit, wherein the control panel is configured to control a barrier operator based at least in part on data the processor unit receives from the user input and the at least one sensor.

30. The control system of claim 27 wherein the at least one sensor includes a camera.

31. The control system of claim 27 wherein the at least one sensor includes a product sensor.

32. The control system of claim 27 wherein the at least one sensor includes a proximity sensor.

33. The control system of claim 25 further comprising the plurality of dock devices, the dock devices including at least one of a movable barrier operator, a floor leveler, an indicator light, a flood light, a trailer securing mechanism, a bumper sensor, and a sealing mechanism.

34. A control system for controlling a plurality of dock devices at a loading dock, the control system comprising:
   a mount configured to connect to a bollard;
   a control panel configured to be connected to the mount, the control panel comprising:
      a user interface having at least one user input for controlling the dock devices;
      a dock device interface adapted to receive information from the dock devices and transmit control information to the dock devices; and
      a processor unit operatively coupled to the user interface and the dock device interface, the processor unit being operable to control the dock devices via the dock device interface;
   an illumination assembly configured to be positioned on a top of the bollard, the illumination assembly configured to be communicatively coupled to the control panel;

wherein the mount includes an elongate crossbar having a first end portion and a second end portion opposite the first end portion, the first end portion configured to be secured to a side of the bollard and the second end portion configured to be secured to a second structure so that the crossbar extends intermediate the side of the bollard and the second structure for supporting the control panel between the second structure and the side of the bollard; and a barrier lock supported by the mount, the barrier lock configured to be communicatively coupled to the control panel.

35. The control system of claim 34 wherein the control panel is configured to receive information from one of the dock devices and to operate another one of the dock devices in response to the received information.

36. The control system of claim 34 wherein the illumination assembly includes at least one sensor.

37. The control system of claim 36 wherein the at least one sensor includes a first sensor oriented to monitor an interior of a trailer at the loading dock and a second sensor oriented to monitor an area outside of the trailer.

38. The control system of claim 36 wherein the at least one sensor includes at least one of an RFID sensor and a bar code scanner configured to identify objects moving through the loading dock.

39. The control system of claim 36 wherein the control panel is configured to control a barrier operator based at least in part on data the processor unit receives from the user input and the at least one sensor.

40. The control system of claim 36 wherein the at least one sensor includes a camera.

41. The control system of claim 36 wherein the at least one sensor includes a product sensor.

42. The control system of claim 36 wherein the at least one sensor includes a proximity sensor.

43. The control system of claim 34 further comprising the plurality of dock devices, the dock devices including at least one of a movable barrier operator, a floor leveler, an indicator light, a flood light, a trailer securing mechanism, a bumper sensor, and a sealing mechanism.

* * * * *